Patented Mar. 29, 1927.

1,622,379

UNITED STATES PATENT OFFICE.

ANTOINE AUGUSTE GUNTZ, OF NANCY, FRANCE.

LUMINESCENT PRODUCT.

No Drawing. Application filed May 8, 1922, Serial No. 559,416, and in France June 10, 1921.

The invention has for its object a luminescent product embodying sulfid of zinc and containing a considerable proportion of cadmium sulfid, such proportion being higher than 1% by weight and may reach 30%.

The sulfid of zinc may be to some extent replaced by one or more sulfids of alkaline earth metals.

The cadmium compound is added during the preparation of the product so as to obtain an intimate association of the sulfids of zinc and cadmium in the product, this effect being produced by co-precipitating the zinc sulfid and cadmium sulfid from the solution. For example during the precipitation of the sulfid of zinc which is one of the operations of the manufacturing process, there is added in the state of solution a salt of cadmium such as cadmium sulfate; the precipitate of mixed sulfids obtained is filtered, washed and dried, and is then heated (of course, without access of air) sufficiently to form crystalline sulfid.

Preparation of ordinary phosphorescent zinc sulfide (old process):

References: de Vissers Recueil trav. Chim. Pays-Bas 20, p. 435, 1901, and 22, p. 133, 1903; Klatt & Lenard Ann. de Physik, 15, p. 225, 1904; Lenard Ann. de Physik, 31, p. 641, 1910; C. Urbain Bull. Soc. Chim. p. 1; La phosphorescence et ses lois; Grune, Ber. Chem. Ges. 373, p. (3407), 1904; R. Thomasheck Ann. des. Phys. T. LXV, p. 189, 1921.

The following is a suitable method of operation according to the above references:

Pure zinc in granular form is exposed to the action of very pure HCl in quantity sufficient so that the whole will dissolve. It is boiled, and the filtered solution, after being allowed to stand is precipitated by pure concentrated ammonia in sufficient excess to redissolve the precipitate. A current of air bubbling in the solution eliminates the excess ammonia. It is then diluted, if necessary, to bring the concentration to about 10 gr. of Zn per litre and filter after standing. The clear solution is precipitated by a current of specially prepared pure hydrogen sulfide.

The precipitate is carefully dried and impregnated with a suitable standard solution of sulfate of copper and alkaline chlorides to have an addition of 1/10,000 copper sulfate and 1/100 alkaline chlorides. The dried pulverized product is calcined moderately at red heat in a covered crucible of very pure refractory material.

*Luminescent production according to the application.*—This is obtained by the partial substitution of cadmium for the zinc as a base product. Applicant's new preparation thus comprises the addition of cadmium and is obtained by using, instead of Zn chloride, a mixture of chloride of zinc and chloride of cadmium, very pure and in suitable proportions. This mixture is then subjected to the series of manipulations above described for phosphorescent zinc sulfide.

As stated, the partial replacement of the zinc by the cadmium is made at any stage of the process, the essential feature being to have finally a solid mixture of the two isomorphous sulfides, sulfide of zinc and sulfide of cadmium.

The crystalline product thus obtained has a color of luminescence ranging from green to red and having the advantage of a finer luminosity and a greater persistence than the usual luminescent sulfid of zinc.

As is well known, in order to produce a luminous zinc sulfid, it is necessary that the zinc salt from which the precipitation is effected contain a small percentage of a copper salt, and it is necessary that hydrogen sulfid be prepared synthetically, and that the introduction of the hydrogen sulfid into the zinc salt solution be performed very gradually (extending over several weeks, or preferably months.)

This product will therefore possess considerable advantage in all the usual applications of products of this class, for it will confer upon the articles obtained either a greater brilliancy or a different color and a greater persistence. Among such articles may be cited: luminescent screens, objects of ornamentation, products rendered radioactive, etc.

I claim:

1. A luminescent product containing sulfid of zinc and from 1% to 30% of cadmium sulfid.

2. A method of obtaining a luminiscent sulfid product which comprises preparing sulfid of zinc by precipitation, adding to the zinciferous solution while the sulfid of zinc is being precipitated, a solution containing a salt of cadmium, thereafter filtering, washing, drying and heating the precipitate sufficiently to render the same crystalline.

3. A luminescent product containing between 1% to 30% by weight of cadmium sulfide, and another luminescent sulfide of the zinc or alkaline earth type, such sulfides being in a crystalline condition.

In testimony whereof I have signed my name to this specification.

ANTOINE AUGUSTE GUNTZ.